POLYSTATION DETECTOR FOR MULTIPLE TARGETS

Filed June 21, 1963 4 Sheets-Sheet 1

INVENTOR.
CALVIN M. HAMMACK
BY
Allen and Chromy

INVENTOR.
CALVIN M. HAMMACK
BY
Allen and Chromy

Nov. 15, 1966 C. M. HAMMACK 3,286,263

POLYSTATION DETECTOR FOR MULTIPLE TARGETS

Filed June 21, 1963 4 Sheets-Sheet 3

INVENTOR.
CALVIN M. HAMMACK
BY
Allen and Chromy $$\begin{pmatrix} \frac{x_1-a_1}{r_{11}} & \frac{y_1-b_1}{r_{11}} & \frac{z_1-c_1}{r_{11}} & -\frac{x_2-a_1}{r_{12}} & -\frac{y_2-b_1}{r_{12}} & -\frac{z_2-c_1}{r_{12}} & -1 \\ \frac{x_1-a_2}{r_{21}} & \frac{y_1-b_2}{r_{21}} & \frac{z_1-c_2}{r_{21}} & -\frac{x_2-a_2}{r_{22}} & -\frac{y_2-b_2}{r_{22}} & -\frac{z_2-c_2}{r_{22}} & -1 \\ \frac{x_1-a_3}{r_{31}} & \frac{y_1-b_3}{r_{31}} & \frac{z_1-c_3}{r_{31}} & -\frac{x_2-a_3}{r_{32}} & -\frac{y_2-b_3}{r_{32}} & -\frac{z_2-c_3}{r_{32}} & -1 \\ \frac{x_1-a_4}{r_{41}} & \frac{y_1-b_4}{r_{41}} & \frac{z_1-c_4}{r_{41}} & -\frac{x_2-a_4}{r_{42}} & -\frac{y_2-b_4}{r_{42}} & -\frac{z_2-c_4}{r_{42}} & -1 \\ \frac{x_1-a_5}{r_{51}} & \frac{y_1-b_5}{r_{51}} & \frac{z_1-c_5}{r_{51}} & -\frac{x_2-a_5}{r_{52}} & -\frac{y_2-b_5}{r_{52}} & -\frac{z_2-c_5}{r_{52}} & -1 \\ \frac{x_1-a_6}{r_{61}} & \frac{y_1-b_6}{r_{61}} & \frac{z_1-c_6}{r_{61}} & -\frac{x_2-a_6}{r_{62}} & -\frac{y_2-b_6}{r_{62}} & -\frac{z_2-c_6}{r_{62}} & -1 \\ \frac{x_1-a_7}{r_{71}} & \frac{y_1-b_7}{r_{71}} & \frac{z_1-c_7}{r_{71}} & -\frac{x_2-a_7}{r_{72}} & -\frac{y_2-b_7}{r_{72}} & -\frac{z_2-c_7}{r_{72}} & -1 \end{pmatrix} \begin{pmatrix} dx_1 \\ dy_1 \\ dz_1 \\ dx_2 \\ dy_2 \\ dz_2 \\ dB \end{pmatrix} = \begin{pmatrix} dm_1 \\ dm_2 \\ dm_3 \\ dm_4 \\ dm_5 \\ dm_6 \\ dm_7 \end{pmatrix}$$

ERROR EQUATION – 7 STATION – 1 READING

FIG_4

INVENTOR
CALVIN M. HAMMACK

United States Patent Office 3,286,263

Patented Nov. 15, 1966

3,286,263

POLYSTATION DETECTOR FOR MULTIPLE TARGETS

Calvin M. Hammack, P.O. Box 304, Saratoga, Calif.

Filed June 21, 1963, Ser. No. 289,609
12 Claims. (Cl. 343—112)

This is a continuation-in-part of applications Serial No. 86,770, filed February 2, 1961, and Serial No. 278,-191, filed May 6, 1963.

My invention relates to the art of of detecting and tracking reflective objects or cooperative equipments by means of sonic waves, electromagnetic waves, or other means, and in particular to detecting and tracking simultaneously a plurality of such reflectors or co-operative equipments and determining with great pre-cision their positions relative to one another.

In my copending patent application Serial No. 86,770 it is shown that the positions of a plurality of points in space may be determined by measuring differences be-tween the lengths of separate propoagation paths which include the said points and certain reference points as points of reflection or termination. As indicated in the referenced patent applications, there is a geometrical relationship between the several significant points of a given system of equipments and reflectors that makes possible the determination of the positions of some of the points when the positions of certain of the points are known and the measurement of the differences of selected simple or segmented distances are performed.

The exact mechanism of the measurement may be chosen from a wide variety of available techniques. Various types of wave motion may be employed and various types of transducers. The measurements may be time dependent or time independent; they may be dependent upon motion of equipments or reflectors, or they may be independent of such motion. In the pre-ferred embodiments of this invention set forth in the referenced patent applications reliance was placed in the motion of various equipments and/or reflectors of the system to perform the measurements. In some of the embodiments of this invention described in the present patent application motion of none of the reflectors or equipments is required. In this measurement technique the differences of essentially simultaneous simple or seg-mented distances are measured. In some other of the embodiments of this invention measurements of changes of simple or segmented distances are measured in addi-tion to the simultaneous differences of such distances. Such measurement procedures may be regarded as hy-brids of the two simpler techniques.

Whereas systems that employ solely measurements of changes of distances may be designed to locate and track a single moving reflector or equipment, the sys-tems dependent upon the measurement of differences of simultaneous distances and independent of motion re-quire for their operation the simultaneous presence of two or more target equipments or reflectors.

My invention is distinct from trilateration and tri-angulation schemes in that no ranges or angles are measured. My invention is distinct from loran type systems in that the maintenance of an analog communi-cation link between stations of the system is not re-quired. In common contemporary engineering parlance: phase coherence between the stations of the system is not required. This aspect may also be described by saying that precise absolute timing references are not required between the stations. A characteristic of schemes know as "hyperbolic" or "elliptic" that is not shared by my method is the ability to perform relative to a single target reflector or target equipment. My method is distinct from these schemes in that it is un-necessary in practical embodiments dependent upon wave motion to measure the delay time required for waves to pass over known paths.

It is an object of my invention to provide a method of determining the position of each of a plurality of re-flectors or radiators whose positions are otherwise un-known.

It is a further object of my invention to provide a method of determining the positions of a plurality of re-flectors or radiators relative to one another.

It is a further object of my invention to provide a method of determining the position of each of a plurality of stationary reflectors or radiators whose positions are otherwise unknown.

It is a further object of my invention to provide a method of determining the positions of a plurality of stationary reflectors or radiators relative to one another.

It is a further object of my invention to provide an improved method of determining the positions of a plu-rality of moving reflectors or radiators.

It is a further object of my invention to provide an improved method of determining the positions of a plu-rality of moving reflectors or radiators relative to one another.

It is a further object of my invention to provide a method of determining the position of reflectors or equipments that is not dependent upon the measurement of the time required for waves or impulses to travel known distances.

Other and further objects of this invention will be apparent to those skilled in the art to which it relates from the following specification, claims and drawings in which briefly:

FIG.4 shows an error equation used to facilitate ex-planation of this invention.

TWO PULSE EMITTERS AS TARGETS

Figure 1:
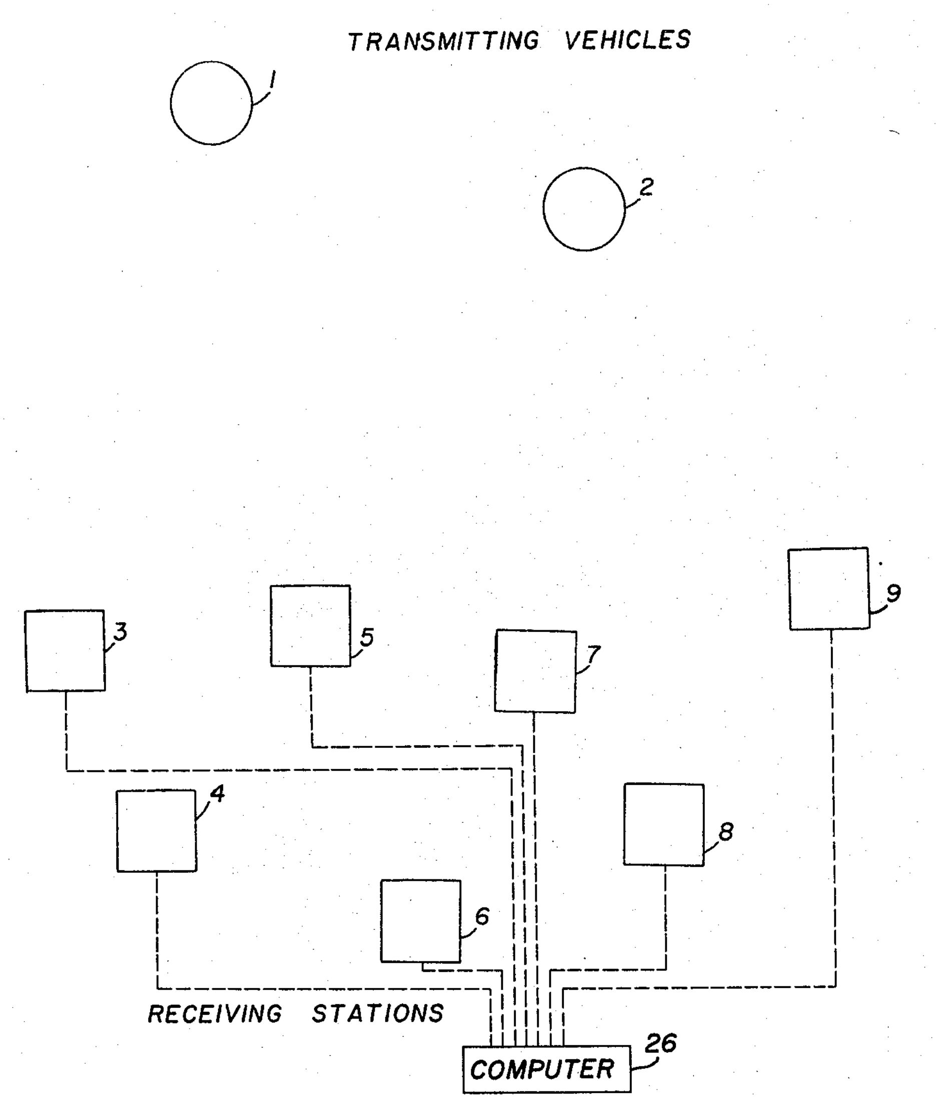
FIG. 1 is a schematic layout of a system of seven receivers and two target vehicles which carry pulse emitters.

It is the purpose of the following preferred embodi-ment of my invention to determine the position of each of two pulsed wave emitters. The wave emitting equip-ments may be carried aboard each of two vehicles 1 and 2 in FIG. 1 whose positions it is desired to determine. The emitted waves are detected at seven receiving sites 3, 4, 5, 6, 7, 8, 9, whose positions are known. At each receiving site the time between the arrival of a pulse from one of the transmitters and a pulse from the other transmitter is measured. There are then seven unknowns and seven measurements for their determination. The seven unknows are the six Cartesian coordinates nec-essary to describe the positions of the two target equip-ments in free-space and the time between the emission of the two pulses by their respective transmitters.

The time interval measured at each of the receiving stations may be equated to the difference between the propagation times from the two target transmitters to the measuring station plus the time between emission of the two pulses by their respective transmitters. One such equation expressed in terms of the Cartesian co-ordinates is evolved for the measurement taken at each station, seven in all; and each equation is independent. The resulting equation set involving seven independent equations in seven unknowns is solvable for the un-knowns. The methods of solving such equations are described in my copending patent application Serial No. 86,770. The pulse repetition rates of the transmitters are made sufficiently low that each pulse reaches all of the receivers before the next is emitted from the same transmitter. The possibility of confusion in identifying the pulses is thus eliminated. Each of the transmitters is assigned its own carrier frequency providing thereby a convenient method for identification at each receiver of the transmitter of each pulse.

*Mathematical relationships of seven station position determination*

The following equation describes the relationship between the measured quantities described above and the geometrical quantities related to the positions of the two target emitters.

$$r_1 - r_2 + B = M \quad (1)$$

Where:

B is the product of the known velocity of the wave propagation and the unknown time interval between the emissions of two pulse sfrom the target emitters,
$r_1$ is the range to the first target emitter,
$r_2$ is the range to the second target emitter,
M is the product of the known velocity of propagation of the emitted wave and the measured time interval.

One may express the ranges in terms of the Cartesian coordinates of the station and the two target point locations.

$$r_2^2 = (x_2 - a)^2 + (y_2 - b)^2 + (z_2 - c)^2 \quad (2)$$

$$r_1^2 = (x_1 + a)^2 + (y_1 - b)^2 + (z_1 - c)^2 \quad (3)$$

Where:

$x_2$, $y_2$, $z_2$ and $x_1$, $y_1$, $z_1$ are the coordinates of the two target points, and *a*, *b*, *c*, are the coordinates of the station.

Combining these equations and differentiating one obtains the following equation:

(4)

$$\frac{x_2 - a}{r_2} dx_2 + \frac{y_2 - b}{r_2} dy_2 + \frac{z_2 - c}{r_2} dz_2 - \frac{x_1 - a}{r_1} dx_1 - \frac{y_1 - b}{r_1} dy_1 - \frac{z_1 - c}{r_1} dz_1 - dB = dM$$

A set of seven such equations may be employed in the well known Newton-Raphson iteration procedure to determine the values of the Cartesian target position coordinates from the measured quantities. FIGURE 4 shows the equation set in matrix form. This equation is called an error equation as it is used in standard engineering practice in both determining the effects of errors of measurement upon the determination of the coordinates of the target positions and in the iteration process of computation of the coordinates of the target positions.

*Modifications of pulse emitter embodiment*

It is possible to reduce the number of stations employed in locating the positions of pulse emitters by increasing the number of emitters. Thus if four emitters are simultaneously within the field of sensitivity of the system, their positions may be determined simultaneously by a system of five receivers. In this case there are fifteen unknowns and fifteen measurements each measurement resulting in an independent equation. The fifteen unknowns are the position coordinates of the four emitters and the time intervals between the emissions of the four pulses, one pulse from each of the four pulse emitters. There are three measurements performed by each of the five stations. The measurements at each station consist of the measuring the time intervals between the arrivals of the said four pulses. Suitable equations relating each of the measured values to the Cartesian coordinates of the four emitters and the unknown time intervals between their separate pulse emissions are written and the resulting equation set solved for the unknowns. Other combinations of numbers of stations and numbers of targets are also possible and one familiar with the art should have no difficulty synthesizing a system to fill his needs using the principles outlined above.

*Five reflectors as targets*

Figure 2:
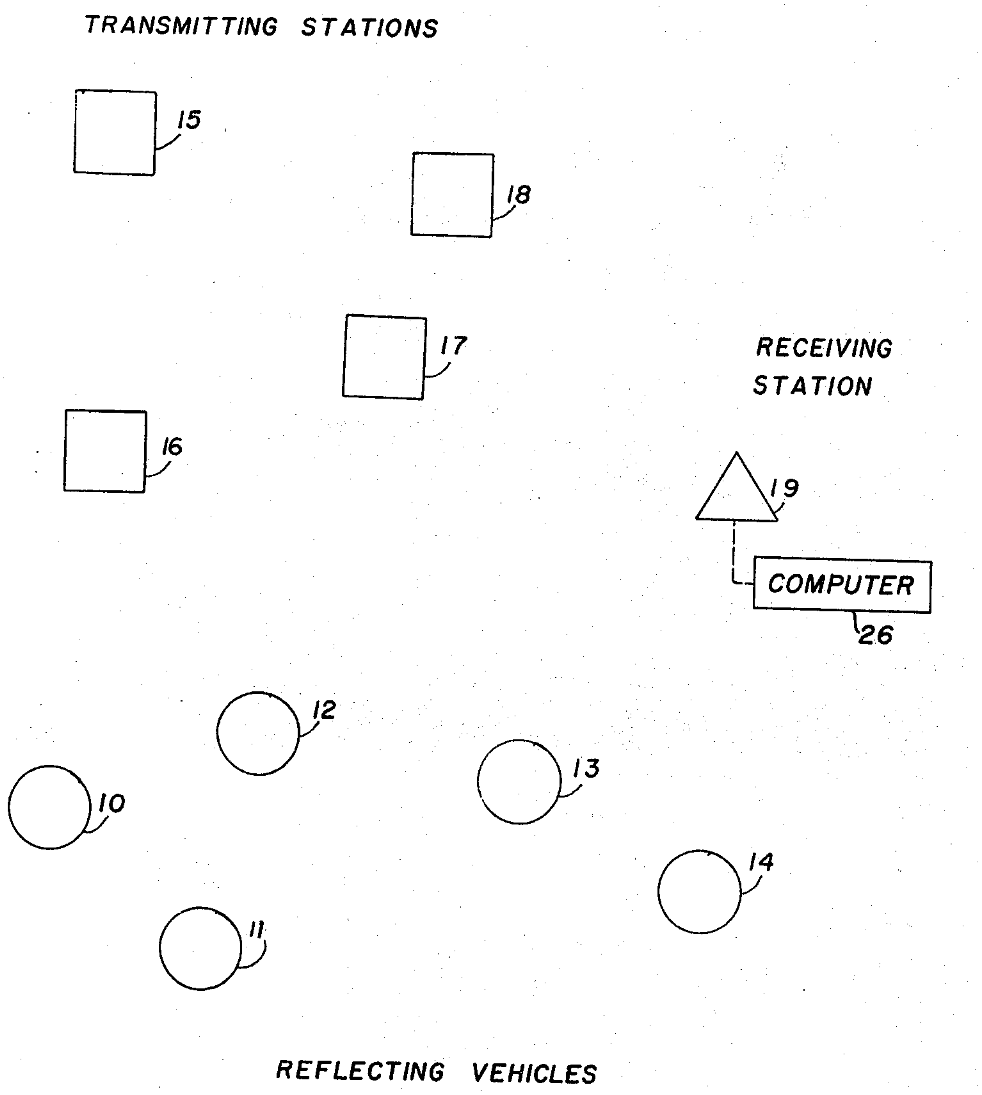
FIG. 2 is a schematic layout of a system for the de-tection of reflecting objects.

In a preferred embodiment of my invention the positions of five reflecting targets 10–14 inclusive shown in FIG. 2 are determined simultaneously by illuminating the five targets by four pulse type wave transmitters 15–18 inclusive and receiving the echo signals from the reflecting targets at a wave receiver 19. The positions of the transmitters and the receiver are each known and are separate and distinct from one another. The positions of the reflecting targets 10–14 inclusive are separate and distinct and are otherwise unknown. Each of the transmitters 15–18 inclusive operates on a different wavelength so that the echo signals corresponding to each of the transmitters may be identified with respect to the others. The pulse repetition rate of each of the transmitters is constant and accurately known. Each of the transmitters 15–18 inclusive radiates waves over a sufficiently wide angle that the emitted waves fall upon each of the reflecting targets. The receiving apparatus is sensitive to waves arriving over a sufficiently great solid angle that the receiver 19 is able to detect the waves from all four reflecting targets simultaneously. Relative to each of the transmitters the receiving equipment measures the difference in the arrival times of the pulse signals echoed from each of the reflecting targets 10–14. In order to reduce confusion of signals the pulse repetition rate of each of the transmitters 15–18 inclusive is held sufficiently low that the echo pulses from all of the reflectors corresponding to one transmitted pulse have arrived at the receiver 19 before the series of echo pulses corresponding to the succeeding transmitted pulse commences to arrive. However, the pulse repetition rate of each transmitter is maintained sufficiently high that there is no appreciable displacement of the reflectors during the occurrence of one complete set of four pulses, one pulse from each transmitter. In this manner the four differences of the five propagation paths corresponding to a single transmitter, the four reflectors, and the receiver are measured. Each propagation path consists of two distance segments: the first is the segment from the transmitter to the target, the second is the segment from the target to the receiver.

There are a total of fifteen unknowns that it is desired to determine. These unknowns are the three Cartesian coordinates of each of the five targets. There are sixteen measurements, four measurements relative to each of the four transmitters. It is seen that there is one more measurement performed by the system than there are unknowns to be determined. This seeming redundancy is employed to resolve the ambiguity of association of the various received echoes corresponding to the several transmitters with the proper reflecting targets. There are at least two mathematical procedures that may be employed to determine the positions of the five targets uniquely. The first is by correlation techniques. The second is by simultaneous solution for all of the positions of all of the targets. Machine computing may be employed in the solution. The method of ambiguity avoidance by simultaneous solution of synthesized equations that are purposely formulated to be perfectly ambiguous in the unknowns of the equation set are described in my copending patent application Serial No. 278,191.

*Modifications of reflector embodiment*

The reflective system may be operated with fewer targets provided that more stations are added to the system complex. A wide variety of combinations of target numbers and numbers of transmitters and receivers are possible. It is not necessary to add stations to handle more than five targets.

Ambiguity may be resolved by use of directional characteristics of the antenna of the receiver and other means described in my copending patent applications Serial Nos. 86,770 and 278,191.

In systems where ambiguity is resolved by instrumental techniques before the computation of position determination is begun it is not necessary to include that amount of data that was taken in order to resolve the ambiguity. For instance, a complete determination of position may be achieved employing only four reflecting targets.

The principles of my invention remain unchanged if the numbers of transmitters and receivers are reversed. There may be a single transmitter and four receiving stations if desired. The data taken at the various receiving sites must of course be conducted to a common place for computation. It may also be desirable to use both a plurality of transmitters and a plurality of receivers. Such a configuration may be employed to resolve ambiguity by correlation procedures.

*Hybrids*

Either the system employing pulse emitters as targets or the system employing reflectors as targets may be designed to include Doppler measurements. The Doppler measurements may be of the rate type or the incremental type. In the operation of such a hybrid system there must of course be motion of the targets. The Doppler type measurements are described in my copending patent applications already mentioned. The difference type measurement, the subject of earlier discussion in this patent application, may be performed at any significant epoch in a series of Doppler incremental type measurements. The equations developed from both the Doppler increment measurements and the difference type measurements are expressed in terms of the position coordinates of the targets and are employed to form a solvable set of simultaneous equations. Care is taken to avoid the inadvertent incorporation of redundant measurements. However, such measurements may be employed for statistical improvement and for resolution of ambiguity.

*Additional features*

As with the Doppler systems described in the previously mentioned patent applications, my invention may be used to determine the position coordinates of the tracking stations relative to each other by simply including such coordinates in the unknowns and taking sufficient independent measurements.

In many systems a single site may contain both a transmitter and a receiver. Generally such design simplifies the mathematics of reflective type systems.

Any modulation envelope, tone, pulse, noise, communication, can be employed in my invention. It is only necessary that the several receiving stations be able to recognize, each in common with the other, discreet reference points on the envelope. The reference point may be recognized through changes in the character of the envelope occurring in the immediate epoch of the point, such as the occurrence of a sharp pulse. The reference point may also be recognized through variations in the envelope occurring over extended intervals of time such as may be accomplished through tone modulation. Thus my invention may be employed to locate noncooperative radiators of modulated waves, such as jammers or communication transmitters, or other types of position determining devices.

*Measurement*

Figure 3:
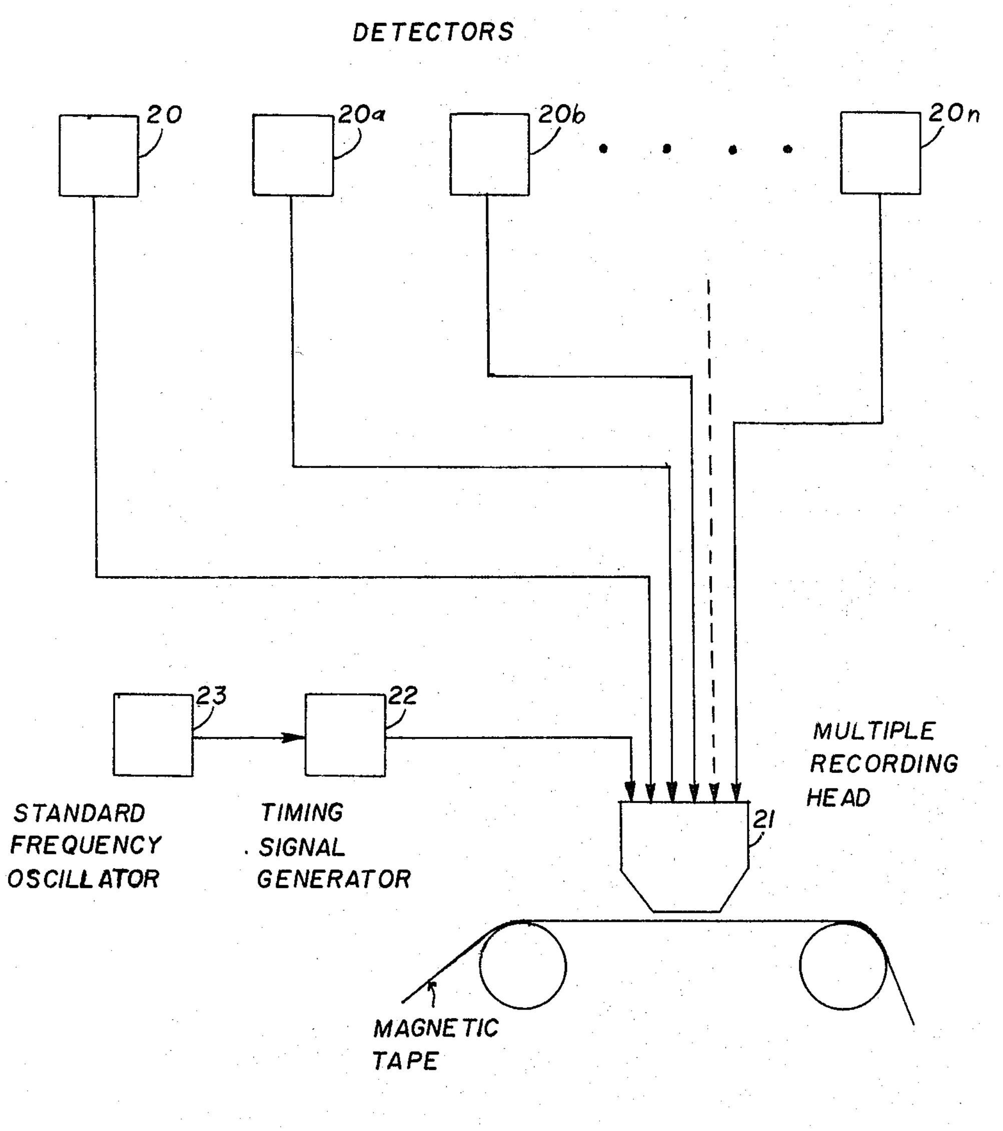
FIG. 3 shows an assembly of equipments for use at a receiving station to perform and record the required measurements.

The measurements required in my invention may be performed using techniques of detection, timing and recording that are common in the art. The measurement of both the difference of simultaneous quantities and the Doppler increments can be performed with the same equipment simultaneously. FIG. 3 indicates an assemblage of equipments for use at a receiving station. The signal from each transmitter is detected by one of the detectors 20, **20*a*, 20*b* and 20*n* which is sensitive only to signals from that transmitter. The output of each detector 20–20*n* is fed to one channel of the recorder head 21 of a multitrack magnetic tape recording device. Also imposed on the tape is a timing signal derived from a timing signal generator 22 which in turn is paced by standard frequency oscillator 23**. Several tracks may be employed for timing signal digits if desired, or a single track with analog timing indication may be employed. This assembly is able to record not only the differences in the times of arrivals of signals from one transmitter but also the difference in the times of arrivals of signals from several transmitters. Furthermore, the system can serve both for use in systems involving reflecting targets and systems for operating with self emitting targets.

For real time tracking the tape recording device may be placed or augmented by an electronic digital storage device and a computer added for automatic computation. There are a wide variety of analog and digital techniques for performing the required measurements and computations available in the art.

*Machine computation*

Where, in an application or modification, of my invention it is desired to automate the computation procedure, either to reduce the human effort or to speed the process of the calculation, the general purpose digital computer finds the most facile adaption to the purpose. This type of machine may be coupled directly to the sensing apparatus or data may be fed into it through magnetic tape, punched tape, or punched cards, or any of a wide variety of input mechanisms such as shift registers. The IBM 7090 computer is such a general purpose digital machine, and a wide variety of peripheral equipment is readily available for almost any computer application. There are many other firms also offering such equipment. In FIGURES 2 and 3 a computer 26 is shown for computer computation.

What I claim is:

1. A method of determining the position of each of a plurality of objects in space comprising the following steps:

Step (1) Establishing a series of reference points,

Step (2) Measuring by wave propagation and detection means time differences linearly dependent upon the differences in lengths of propagation paths of waves which propagation paths are different because of the difference in the positions of the various objects, and which are dependent upon the positions of the said reference points, and Step (3) Computing the positions of the objects using the measured data by solving a set of simultaneous equations which set comprises as unknown quantities the orthogonal coordinates of the positions of said objects and comprises as known quantities values of the measurements performed in Step (2).

2. A method of determining the position of each of a plurality of objects in space comprising the following steps:

Step (1) Establishing a plurality of reference points,

Step (2) Measuring quantities linearly related to the differences in certain distances, which distances are different because of the differences of the positions of the several objects and which distances are dependent upon the positions of the said reference points, Step (3) Computing from the measured data the positions of the objects by solving a set of simultaneous equations which set comprises as unknown quantities orthogonal coordinates of the positions of said objects and comprises as known quantities values of the measurements performed in Step (2).

3. A method of determining the position of each of a plurality of moving objects in space comprising the following steps:

Step (1) Establishing a plurality of reference points,

Step (2) Measuring first quantities linearly related to the differences between certain simultaneous distances and measuring second quantities linearly related to changes in said certain simultaneous distances, which certain simultaneous distances are different and changing because of the differences and changes of the positions of the several moving objects and which certain simultaneous distances are dependent upon the positions of the said reference points, Step (3) Computing from the measured data the positions of the objects by solving a set of simultaneous equations which set comprises as known quantities values of the measurements performed in Step (2).

4. A method of determining the position of each of a plurality of moving objects in space comprising the following steps:

Step (1) Establishing a plurality of reference points,

Step (2) Measuring by wave propagation and detection means first quantities linearly dependent upon differences in the lengths of simultaneous wave propagation paths and second quantities linearly dependent upon changes in said simultaneous wave propagation paths which propagation paths are different and changing because of the differences and changes of the positions of the several moving objects and which are dependent upon the positions of the said reference points, Step (3) Computing the positions of the objects using the measured data of Step (2) by solving a set of simultaneous equations which set comprises as known quantities values of the measurements performed in Step (2).

5. A method of determining the position of each of a plurality of wave reflectors in space comprising the following steps:

Step (1) Establishing at known separate positions a plurality of pulsed wave transmitters and a single wave receiver, which receiver is sensitive to pulses emitted from each transmitter, said transmitters and said receiver being so designed that the receiver is capable of identifying the pulses of each transmitter, Step (2) Measuring at said receiver time intervals between arrivals of said pulses, said time intervals being linearly dependent upon the differences in the segmented propagation paths of the waves emitted by the several transmitters, reflected by the several reflectors, and detected by the receiver, Step (3) Computing from the measured data the positions of the several wave reflectors by solving a set of simultaneous equations, said set comprising as unknown quantities the coordinates of the positions of said wave reflectors and comprising as known quantities measured values derived in Step (2).

6. A method of determining the position of each of a plurality of vehicles comprising the following steps:

Step (1) Establishing aboard each of the vehicles a transmitter of wave pulses,

Step (2) Establishing at known and separate points a plurality of receiving stations capable of detecting the pulsed waves from the transmitters aboard the vehicles, Step (3) Measuring at each receiving station quantities that each separately consists of the difference in the travel times of pulses propagating from each of one pair of transmitters to the measuring station plus the time difference between the emissions of the pulses from the two transmitters of the pair, Step (4) Computing the positions of the vehicles from the measured data by solving a set of simultaneous equations, said set comprising as unknown quantities the coordinates of the positions of said vehicles and comprising as known quantities values measured in Step (3).

7. A method of determining the position of each of a plurality of moving vehicles cmoprising the following steps not necessarily in time sequence:

Step (1) Establishing aboard each of the vehicles a transmitter of modulated waves, Step (2) Establishing at known and separate points a plurality of receivers, Step (3) Detecting at each of said receivers the modulated waves from each of the transmitters, Step (4) Measuring at each of said receivers the differences in the times of arrivals of time reference points characteristic of each modulation envelope, Step (5) Measuring at each of said receivers the time difference between the arrivals of successive envelope reference points of the same transmitter, and Step (6) Employing data measured in Step (4) and Step (5) computing the positions of the moving vehicles by solving a set of simultaneous equations, said set comprising as unknown quantities the coordinates of the positions of said vehicles and comprising as known quantities values measured in Step (4) and Step (5).

8. A method of determining the positions of a plurality of noncooperative emitters of modulated waves, such as jamming signals or communication signals serving other purposes, comprising the following steps:

Step (1) Establishing at separate positions a plurality of receiving equipments each capable of detecting the modulated waves from the several transmitters, Step (2) Detecting at each of the stations and relative to each of the signal envelopes separately a reference point common to the receiving equipments at the other sites, Step (3) Measuring at each of the stations the differences in the arrival times of the reference points of the separate envelopes of the several transmitters, Step (4) Computing the positions of the several transmitters from the data collected in Step (3) by solving a set of simultaneous equations, said set comprising as unknown quantities the coordinates of the positions of said transmitters and comprising as known quantities values measured in Step (3).

9. A method of determining the positions of a plurality of noncooperative moving emitters of modulated waves, such as jammers and communications transmitters, comprising the following steps:

Step (1) Establishing at separate positions a plurality of receiving equipments each capable of detecting the modulated waves from the several transmitters, Step (2) Detecting at each of the stations and relative to each of the signal envelopes separately a series of two or more reference points common to the corresponding envelopes detected by the other receiving stations, Step (3) Measuring at each of the stations the differences in the arrival times of the reference points of the separate modulation envelopes of the several transmitters, Step (4) Measuring at each of the stations the time differences in the arrivals of successive reference points on each envelope, Step (5) Computing from the measured data the positions of the moving transmitters by solving a set of simultaneous equations, said set comprising as unknown quantities the coordinates of the positions of said emitters and comprising as known quantities values measured by Step (4) and Step (5).

10. A method of determining the positions of a plurality of moving objects comprising the following steps not necessarily in time sequence:

Step (1) Establishing a plurality of reference points in space,

Step (2) Measuring relative to pairs of the moving objects and each reference point quantities that are linearly related to the difference in the ranges of the two moving objects of each pair to the said reference point, Step (3) Measuring changes in the range between each moving object and each reference point, Step (4) From the data collected in Step (2) and Step (3) computing the positions of the moving objects by solving a set of simultaneous equations, said set comprising as known quantities values measured in Step (2) and Step (3).

11. A method of determining the positions of a plurality of objects comprising the following steps:

Step (1) Establishing a plurality of reference points in space,

Step (2) Measuring relative to pairs of the objects and each reference point quantities that are linearly related to the difference in the ranges of the two objects of each pair to the said reference point, Step (3) From the data collected in Step (2) computing the positions of the objects by solving a set of simultaneous equations which set comprises as known quantities the values measured in Step (2).

12. A method of determining the position of a plurality of objects comprising the following steps not necessarily in time sequence:

Step (1) Establishing a plurality of reference points in space,

Step (2) Measuring relative to a pair of objects and a pair of reference points a quantity linearly related to the difference between the segmented distances from one reference point to one of the objects thence to the other reference point and the segmented distance from the first reference point to the second object and thence to the second reference point, Step (3) Performing Step (2) relative to various pairs of reference points in combination with at least one pair of objects, Step (4) Computing from the data collected in Step (2) and Step (3) the positions of the several objects by solving a set of simultaneous equations, said set comprising as unknown quantities the coordinates of the positions of said objects and as known quantities values measured in Step (2) and Step (3).

References Cited by the Examiner

UNITED STATES PATENTS

| | | | |
|---|---|---|---|
| 2,968,034 | 1/1961 | Cafarelli | 343—112 |
| 3,060,426 | 9/1962 | Williams. | |

OTHER REFERENCES

Anderson: I.R.E., Proc., vol. 47, September 1959, pp. 1658–1659.

Carrara et al.: I.R.E., Proc., vol. 47, January 1959, page 75.

Hoffman: I.R.E., National Convention Record, vol. 7, part 5, 1959, pp. 227–239.

CHESTER L. JUSTUS, *Primary Examiner.*

R. E. BERGER, *Assistant Examiner.*